United States Patent
Miyake et al.

(10) Patent No.: US 9,605,174 B2
(45) Date of Patent: Mar. 28, 2017

(54) ACTIVE ENERGY RAY CURABLE AQUEOUS RESIN COMPOSITION, ACTIVE ENERGY RAY CURABLE AQUEOUS COATING MATERIAL, AND ARTICLE COATED WITH THE COATING MATERIAL

(71) Applicant: DIC Corporation, Tokyo (JP)

(72) Inventors: Masahiro Miyake, Osaka (JP); Takashi Mukai, Osaka (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/356,345

(22) PCT Filed: Jan. 10, 2013

(86) PCT No.: PCT/JP2013/050291
§ 371 (c)(1),
(2) Date: May 5, 2014

(87) PCT Pub. No.: WO2013/108707
PCT Pub. Date: Jul. 25, 2013

(65) Prior Publication Data
US 2014/0309360 A1  Oct. 16, 2014

(30) Foreign Application Priority Data
Jan. 17, 2012 (JP) ................. 2012-007025

(51) Int. Cl.
| | |
|---|---|
| *C08G 18/62* | (2006.01) |
| *C08G 18/67* | (2006.01) |
| *C08L 75/04* | (2006.01) |
| *C09D 133/10* | (2006.01) |
| *C09D 5/02* | (2006.01) |
| *C09D 133/14* | (2006.01) |
| *C08G 18/75* | (2006.01) |
| *C09D 175/16* | (2006.01) |
| *C09D 133/06* | (2006.01) |

(52) U.S. Cl.
CPC ....... *C09D 133/10* (2013.01); *C08G 18/6229* (2013.01); *C08G 18/673* (2013.01); *C08G 18/755* (2013.01); *C08G 18/758* (2013.01); *C09D 5/02* (2013.01); *C09D 133/066* (2013.01); *C09D 133/14* (2013.01); *C09D 175/16* (2013.01); *C08L 2201/54* (2013.01); *C08L 2312/06* (2013.01)

(58) Field of Classification Search
CPC  C09D 133/14; C09D 133/10; C09D 133/066; C09D 175/16; C08G 18/6229; C08G 18/673; C08G 18/755; C08G 18/758; C08L 75/04; C08L 2201/54; C08L 2312/06
See application file for complete search history.

(56) References Cited

U.S. PATENT DOCUMENTS

| | | | | |
|---|---|---|---|---|
| 4,038,257 A | * | 7/1977 | Suzuki .................. | C08F 120/36 528/75 |
| 4,108,840 A | * | 8/1978 | Friedlander .......... | C08F 299/06 522/44 |
| 6,270,905 B1 | * | 8/2001 | Swarup ............... | C08F 290/062 428/461 |
| 2003/0003359 A1 | | 1/2003 | Banno et al. | |
| 2003/0069353 A1 | * | 4/2003 | Suganuma ............. | C08G 18/62 525/28 |
| 2010/0093924 A1 | * | 4/2010 | Lerschmacher ......... | C08F 8/30 524/589 |

FOREIGN PATENT DOCUMENTS

| | | |
|---|---|---|
| EP | 1329468 A1 | 7/2003 |
| JP | H03-250014 A | 11/1991 |
| JP | H05-271384 A | 10/1993 |
| JP | 2002-216845 A | 8/2002 |
| JP | 2002-270235 A | 9/2002 |
| JP | 2003-064149 A | 3/2003 |
| JP | 2004-010779 A | 1/2004 |
| JP | 2004-244435 A | 9/2004 |
| JP | 2007-002048 A | 1/2007 |
| JP | 2008-156659 A | 7/2008 |
| JP | 2012-214759 A | 11/2012 |
| WO | 2008/056569 A1 | 5/2008 |

OTHER PUBLICATIONS

International Search Report, mailed Mar. 26, 2013, which issued during the prosecution of International Application No. PCT/JP2013/050291, which corresponds to the present application.

* cited by examiner

*Primary Examiner* — Karuna P Reddy
(74) *Attorney, Agent, or Firm* — McDermott Will & Emery LLP

(57) ABSTRACT

The present invention provides an active energy ray curable aqueous resin composition prepared by reacting an acrylic resin (A), a polyisocyanate compound (B), and (meth)acrylate (C) having a hydroxyl group and dispersing the reaction product in an aqueous medium, the resin (A) being produced by copolymerizing an acrylic monomer (a1) having a polyoxyalkylene group, an acrylic monomer (a2) having a hydroxyl group, and an acrylic monomer (a3) other than the acrylic monomer (a1) and the acrylic monomer (a2) as essential raw materials. The active energy ray curable aqueous resin composition has excellent storage stability and forms a cured coating film with a good appearance and high adhesion to a substrate even after immersion in hot water, and thus can be desirably used for an active energy ray curable aqueous coating material.

8 Claims, No Drawings

ACTIVE ENERGY RAY CURABLE AQUEOUS RESIN COMPOSITION, ACTIVE ENERGY RAY CURABLE AQUEOUS COATING MATERIAL, AND ARTICLE COATED WITH THE COATING MATERIAL

CROSS REFERENCE TO PRIOR APPLICATIONS

This application is a U.S. National Phase application under 35 U.S.C. §371 of International Application No. PCT/JP2013/050291, filed on Jan. 10, 2013 and claims benefit of priority to Japanese Patent Application No. 2012-007025, filed on Jan. 17, 2012. The International Application was published in Japanese on Jul. 25, 2013 as WO 2013/108707 A1 under PCT Article 21(2). The contents of the above applications are hereby incorporated by reference.

TECHNICAL FIELD

The present invention relates to an active energy ray curable aqueous resin composition having excellent storage stability and forming a cured coating film with a good appearance and high adhesion to a substrate even after immersion in hot water, an active energy ray curable aqueous coating material containing the composition, and an article coated with the coating material.

BACKGROUND ART

Active energy ray curable compositions are used as hard coating agents for plastic substrates of home electric products, cellular phones, etc. because of the characteristics of a little heat history applied to coating substrates and excellent coating hardness and scratch resistance. An example of the active energy ray curable compositions is an active energy ray curable composition (solvent-type active energy ray curable composition) containing an acryl acrylate polymer having a polymerizable unsaturated double bond and a polymer not having an unsaturated double bond such as a polymerizable acrylic resin, a polymerizable monomer, and an organic solvent used as a diluent. For example, when this active energy ray curable composition is used as a coating material for spray coating, it is necessary for the coating material to contain the organic solvent in a large amount of 50 to 90% by mass. Therefore, when cured coating films are formed on surfaces of substrates such as plastic and the like by using an active energy ray curable coating material containing the resin composition, the organic solvent in the coating material is evaporated, thereby causing the problem of worsening working environments. The evaporated organic solvent also causes air pollution.

In contrast, an active energy ray curable aqueous resin composition (for example, refer to Patent Literatures 1 and 2) using water, not an organic solvent, as a diluent is proposed. The active energy ray curable aqueous resin composition is made aqueous by neutralizing acid groups such as a carboxyl group and the like introduced into a resin with ammonia or organic amine to impart water solubility and dispersibility to the resin. However, the resin made aqueous by neutralizing the acid groups has poor storage stability, and thus has the problem of partial separation of the active energy ray curable aqueous resin composition and the problem of easily producing failures such as cissing, whitening, or the like in cured coating films of the composition.

Accordingly, there is demand for an active energy ray curable aqueous resin composition having excellent storage stability and high transparency and being capable of forming cured coating films with excellent appearances.

CITATION LIST

Patent Literature

PTL 1: Japanese Unexamined Patent Application Publication No. 2004-010779
PTL 2: International Publication No. WO2008/056569

SUMMARY OF INVENTION

Technical Problem

A problem to be solved by the present invention is to provide an active energy ray curable aqueous resin composition having excellent storage stability and forming a cured coating film with a good appearance and high adhesion to a substrate even after immersion in hot water, and to provide an active energy ray curable aqueous coating material containing the composition and an article coated with the coating material.

Solution to Problem

As a result of keen research for solving the problem, the inventors found that an active energy ray curable aqueous resin composition prepared by reacting a polymer with a polyisocyanate compound and (meth)acrylate having a hydroxyl group and then dispersing the reaction product in an aqueous medium, the polymer being produced by copolymerizing an acrylic monomer having a polyoxyalkylene group, an acrylic monomer having a hydroxyl group, and another acrylic monomer as essential raw materials, can be used as a resin of an aqueous coating material, and the coating material has excellent storage stability and forms a cured coating film with a good appearance and high adhesion to a substrate even after immersion in hot water, leading to the achievement of the present invention.

That is, the present invention relates to an active energy ray curable aqueous resin composition prepared by reacting an acrylic resin (A) with a polyisocyanate compound (B) and (meth)acrylate (C) having a hydroxyl group and then dispersing the reaction product in an aqueous medium, the resin (A) being produced by copolymerizing an acrylic monomer (a1) having a polyoxyalkylene group, an acrylic monomer (a2) having a hydroxyl group, and an acrylic monomer (a3) other than the acrylic monomer (a1) and the acrylic monomer (a2) as essential raw materials, and also relates to an active energy ray curable aqueous coating material containing the composition and an article coated with the coating material.

Advantageous Effects of Invention

An active energy ray curable aqueous resin composition of the present invention has excellent storage stability and forms a cured coating film with a good appearance and high adhesion to a substrate even after immersion in hot water, and is thus useful for an active energy ray curable aqueous coating material and can be used for coating various articles with the coating material. Therefore, the active energy ray curable aqueous resin composition of the present invention can be desirably used for a coating material used for coating articles such as casings of home electric appliances such as a television, a refrigerator, a washing machine, an air conditioner, and the like; casings of electronic apparatuses such as a personal computer, a smartphone, a cellular phone, a digital camera, a game machine, and the like; interior materials of various vehicles such as an automotive car, a railcar, and the like; various building materials such as a decorative sheet, and the like; wood materials of a furniture and the like, and artificial/synthetic leathers; a FRP bath; etc.

DESCRIPTION OF EMBODIMENTS

An active energy ray curable aqueous resin composition of the present invention is prepared by reacting an acrylic resin (A), a polyisocyanate compound (B), and (meth) acrylate (C) having a hydroxyl group and then dispersing the reaction product in an aqueous medium, the resin (A) being produced by copolymerizing an acrylic monomer (a1) having a polyoxyalkylene group, an acrylic monomer (a2) having a hydroxyl group, and an acrylic monomer (a3) other than the acrylic monomer (a1) and the acrylic monomer (a2) as essential raw materials.

First, the acrylic resin (A) is described. The acrylic resin (A) is produced by copolymerizing an acrylic monomer (a1) having a polyoxyalkylene group, an acrylic monomer (a2) having a hydroxyl group, and an acrylic monomer (a3) other than the acrylic monomer (a1) and the acrylic monomer (a2) as raw materials.

The acrylic monomer (a1) is a compound having a polyoxyalkylene group and a (meth)acryloyl group. Examples of the polyoxyalkylene group include a polyoxyethylene group, a polyoxypropylene group, a polyoxybutylene group, and the like.

In the present invention, the term "(meth)acrylic acid" represents one or both of methacrylic acid and acrylic acid, the term "(meth)acrylate" represents one or both of methacrylate and acrylate, and the term "(meth)acryloyl group" represents one or both of a methacryloyl group and an acryloyl group.

Also, an example of the acrylic monomer (a1) is represented by general formula (1) below.

[Chem. 1]

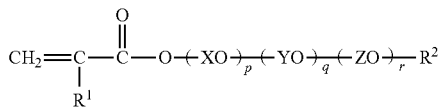

(1)

(wherein $R^1$ represents a hydrogen atom or a methyl group, X, Y, and Z each independently represent an alkylene group, p, q, and r each represent 0 or an integer of 1 or more, a total of p, q, and r is an integer of 1 or more, and $R^2$ represents a hydrogen atom, an alkyl group having 1 to 6 carbon atoms, or a phenyl group.)

In the general formula (1), X, Y, and Z each represent an alkylene group, and examples of the alkylene group include an ethylene group, a propylene group, a butylene group, and the like, which may have a substituent.

In the general formula (1), p, q, and r each represent a number of oxyalkylene repeat units, and a total of p, q, and r is preferably 4 to 100, more preferably 6 to 50, and still more preferably 8 to 25 because dispersibility in water is improved, and the storage stability of the resultant active energy ray curable aqueous resin composition is improved. In addition, a repeat unit containing X, a repeat unit containing Y, and a repeat unit containing Z may be randomly arranged or arranged in a block form.

In the general formula (1), $R^2$ represents a hydrogen atom, an alkyl group having 1 to 6 carbon atoms, or a phenyl group. When $R^2$ is a hydrogen atom, the acrylic monomer (a1) is a mono(meth)acrylic acid ester of polyalkylene glycol such as polyethylene glycol, polypropylene glycol, polybutylene glycol, or the like, and when $R^2$ is an alkyl group having 1 to 6 carbon atoms or a phenyl group, the acrylic monomer (a1) is an alkylene glycol mono(meth) acrylic acid ester sealed with an alkyl group having 1 to 6 carbon atoms or a phenyl group at an end which is not a (meth)acryloyl group. Among these, $R^2$ is preferably an alkyl group having 1 to 3 carbon atoms and more preferably a methyl group because dispersibility in water is improved and the storage stability of the resultant active energy ray curable aqueous resin composition is improved.

More specific examples of the acrylic monomer (a1) include polyethylene glycol (meth)acrylate, methoxypolyethylene glycol (meth)acrylate, ethoxypolyethylene glycol (meth)acrylate, propoxypolyethylene glycol (meth)acrylate, butoxypolyethylene glycol (meth)acrylate, phenoxypolyethylene glycol (meth)acrylate, polypropylene glycol (meth)acrylate, methoxypolypropylene glycol (meth)acrylate, ethoxypolypropylene glycol (meth)acrylate, propoxypolypropylene glycol (meth)acrylate, butoxypolypropylene glycol (meth)acrylate, phenoxypolypropylene glycol (meth) acrylate, polybutylene glycol (meth)acrylate, methoxypolybutylene glycol (meth)acrylate, ethoxypolybutylene glycol (meth)acrylate, propoxypolybutylene glycol (meth)acrylate, butoxypolybutylene glycol (meth)acrylate, phenoxypolybutylene glycol (meth)acrylate, polyethylene glycol-polypropylene glycol (meth)acrylate, methoxypolyethylene glycol-polypropylene glycol (meth)acrylate, phenoxypolyethylene glycol-polypropylene glycol (meth)acrylate, polyethylene glycol-polybutylene glycol (meth) acrylate, methoxypolyethylene glycol-polybutylene glycol (meth)acrylate, phenoxypolyethylene glycol-polybutylene glycol (meth)acrylate, and the like. Among these acrylic monomers (a1), those having a polyoxyethylene group are preferred because of good dispersibility of the acrylic resin (A) in an aqueous medium. Also, these acrylic monomers (a1) can be used alone or in combination of two or more.

The acrylic monomer (a2) is a compound having a hydroxyl group and a (meth)acryloyl group. Specific examples of the acrylic monomer (a2) include 2-hydroxyethyl (meth)acrylate, 3-hydroxypropyl (meth)acrylate, 4-hydroxy-n-butyl (meth)acrylate, 2-hydroxypropyl (meth)acrylate, 2-hydroxy-n-butyl (meth)acrylate, 3-hydroxy-n-butyl (meth)acrylate, 1,4-cyclohexanedimethanol mono(meth)acrylate, N-(2-hydroxyethyl) (meth) acrylamide, glycerin mono(meth)acrylate, polyethylene glycol mono(meth)acrylate, polypropylene glycol mono(meth)acrylate, 2-hydroxy-3-phenoxypropyl (meth)acrylate, 2-(meth)acryloyloxyethyl-2-hydroxyethyl phthalate, lactone-modified (meth)acrylate terminated with a hydroxyl group, and the like. These acrylic monomers (a2) can be used alone or in combination of two ore more.

The acrylic monomer (a3) is an acrylic monomer other than the acrylic monomers (a1) and (a2), and examples thereof include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, n-hexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, cetyl (meth)acrylate, stearyl (meth)

acrylate, behenyl (meth)acrylate, cyclohexyl (meth)acrylate, 4-tert-butylcyclohexyl (meth)acrylate, isobornyl (meth) acrylate, dicyclopentanyl (meth)acrylate, benzyl (meth) acrylate, acrylamide, N,N-dimethyl (meth) acrylamide, (meth) acrylonitrile, 3-(meth)acryloylpropyl trimethoxysilane, N,N-dimethylaminoethyl (meth)acrylate, glycidyl (meth)acrylate, and the like. Among these acrylic monomers (a3), aliphatic or alicyclic acrylic monomers are preferred because the storage stability of the resultant active energy ray curable aqueous resin composition is improved, and in particular, alicyclic acrylic monomers are more preferred. In addition, the acrylic monomers (a3) can be used alone in combination of two or more.

Besides the acrylic monomer (a1), the acrylic monomer (a2), and the acrylic monomer (a3) as the essential raw materials, another monomer (a4) may be used as a raw material of the acrylic resin (A). Examples of the other monomer (a4) include aromatic vinyl monomers such as styrene, α-methylstyrene, p-methylstyrene, p-methoxystyrene, and the like.

Because dispersibility in water is improved, and the storage stability of the resultant active energy ray curable aqueous resin composition is improved, the amount of the acrylic monomer (a1) used is preferably within a range of 20% to 90% by mass, more preferably within a range of 30% to 80% by mass, and still more preferably within a range of 40% to 70% by mass in terms of mass ratio in the monomer components used as the raw materials of the acrylic resin (A). Because dispersibility in water is improved, and the storage stability of the resultant active energy ray curable aqueous resin composition is improved, the amount of the acrylic monomer (a2) used is preferably within a range of 2% to 30% by mass, more preferably within a range of 3% to 25% by mass, and still more preferably within a range of 5% to 20% by mass in terms of mass ratio in the monomer components used as the raw materials of the acrylic resin (A). The amount of the acrylic monomer (a3) used and the other monomer (a4) used if required is a residue obtained by subtracting the ratios of the acrylic monomer (a1) used and the acrylic monomer (a2) used from a total of 100% by mass of the monomer components as the raw materials of the acrylic resin (A).

A method for producing the acrylic resin (A) is, for example, a method in which the acrylic monomers (a1) to (a3) and, if required, the other monomer (a4) are copolymerized in an organic solvent using a polymerization initiator. The organic solvent used is preferably an alcohol compound, a ketone compound, an ester compound, an ether compound, an amide compound, a sulfoxide compound, or a hydrocarbon compound, and examples thereof include methanol, ethanol, propanol, n-butanol, iso-butanol, tert-butanol, 3-methoxybutanol, acetone, methyl ethyl ketone, methyl isobutyl ketone, cyclohexanone, ethyl acetate, butyl acetate, propylene glycol monomethyl ether acetate, diisopropyl ether, ethylene glycol monomethyl ether, ethylene glycol monoethyl ether, ethylene glycol monobutyl ether, ethylene glycol dimethyl ether, diethylene glycol dimethyl ether, diethylene glycol diethyl ether, diethylene glycol dibutyl ether, propylene glycol monomethyl ether, propylene glycol monopropyl ether, propylene glycol monobutyl ether, propylene glycol dimethyl ether, dipropylene glycol monomethyl ether, dipropylene glycol dimethyl ether, dimethyl formamide, dimethyl acetamide, N-methylpyrrolidone, dimethyl sulfoxide, tetrahydrofuran, dioxane, toluene, xylene, and the like. Among these, dialkylene glycol dialkyl ethers such as diethylene glycol dimethyl ether, diethylene glycol diethyl ether, dipropylene glycol dimethyl ether, and the like are more preferred because the storage stability of the resultant active energy ray curable aqueous resin composition is improved.

Examples of the polymerization initiator include organic peroxides such as ketone peroxide compounds such as cyclohexanone peroxide, 3,3,5-trimethylcyclohexanone peroxide, methylcyclohexanone peroxide, and the like; peroxyketal compounds such as 1,1-bis(tert-butylperoxy)-3,3, 5-trimethylcyclohexanone, 1,1-bis(tert-butylperoxy) cyclohexanone, n-butyl-4,4-bis(tert-butylperoxy) valerate, 2,2-bis(4,4-ditert-butylperoxycyclohexyl)propane, 2,2-bis (4,4-ditert-amylperoxycyclohexyl)propane, 2,2-bis(4,4-di-tert-hexylperoxycyclohexyl)propane, 2,2-bis(4,4-di-tert-octylperoxycyclohexyl)propane, 2,2-bis(4,4-dicumylperoxycyclohexyl)propane, and the like; hydroperoxides such as cumene hydroperoxide, 2,5-dimethylhexane-2,5-dihydroperoxide, and the like; dialkyl peroxide compounds such as 1,3-bis(tert-butylperoxy-m-isopropyl)benzene, 2,5-dimethyl-2,5-di(tert-butylperoxy)hexane, diisopropylbenzene peroxide, tert-butylcumyl peroxide, and the like; diacyl peroxide compounds such as decanoyl peroxide, lauroyl peroxide, benzoyl peroxide, 2,4-dichlorobenzoyl peroxide, and the like; peroxycarbonate compounds such as bis(tert-butylcyclohexyl) peroxydicarbonate and the like; peroxyester compounds such as tert-butylperoxy-2-ethyl hexanoate, tert-butyl peroxybenzoate, 2,5-dimethyl-2,5-di(benzoylperoxy)hexane, and the like; and azo compounds such as 2,2'-azobisisobutyronitrile, 1,1'-azobis (cyclohexane-1-carbonitrile), and the like.

In producing the acrylic resin (A), if required, a chain transfer agent such as lauryl mercaptan, 2-mercaptoethanol, thioglycerol, ethylthioglycolic acid, octylthioglycolic acid, or the like may be used.

Because dispersibility in water is improved, and the storage stability of the resultant active energy ray curable aqueous resin composition is improved, the hydroxyl value of the acrylic resin (A) is preferably in a range of 5 to 130, more preferably in a range of 10 to 100, and still more preferably in a range of 15 to 80.

Because dispersibility in water is improved, and the storage stability of the resultant active energy ray curable aqueous resin composition is improved, the weight-average molecular weight (Mw) of the acrylic resin (A) is preferably in a range of 3,000 to 100,000, more preferably in a range of 4,000 to 50,000, and still more preferably in a range of 5,000 to 30,000. The weight-average molecular weight (Mw) is a value in terms of polystyrene based on measurement by gel permeation chromatography (abbreviated as "GPC" hereinafter). The conditions of GPC measurement are as described below.

[Conditions of GPC Measurement]

Measuring apparatus: high-speed GPC apparatus ("HLC-8220GPC" manufactured by Tosoh Co., Ltd.)

Column: columns below manufactured by Tosoh Co., Ltd. were connected in series and used.

"TSKgel G5000" (7.8 mm I. D.×30 cm)×1 column
"TSKgel G4000" (7.8 mm I. D.×30 cm)×1 column
"TSKgel G3000" (7.8 mm I. D.×30 cm)×1 column
"TSKgel G2000" (7.8 mm I. D.×30 cm)×1 column Detector: RI (differential refractometer)
Column temperature: 40° C.
Eluent: tetrahydrofuran (THF)
Flow rate: 1.0 ml/min
Injection amount: 100 µL (tetrahydrofuran solution with a sample concentration of 4 mg/mL)

Standard sample: a calibration curve was formed by using monodisperse polystyrene described below.

(Monodisperse Polystyrene)

"TSKgel standard polystyrene A-500" manufactured by Tosoh Co., Ltd.

"TSKgel standard polystyrene A-1000" manufactured by Tosoh Co., Ltd.

"TSKgel standard polystyrene A-2500" manufactured by Tosoh Co., Ltd.

"TSKgel standard polystyrene A-5000" manufactured by Tosoh Co., Ltd.

"TSKgel standard polystyrene F-1" manufactured by Tosoh Co., Ltd.

"TSKgel standard polystyrene F-2" manufactured by Tosoh Co., Ltd.

"TSKgel standard polystyrene F-4" manufactured by Tosoh Co., Ltd.

"TSKgel standard polystyrene F-10" manufactured by Tosoh Co., Ltd.

"TSKgel standard polystyrene F-20" manufactured by Tosoh Co., Ltd.

"TSKgel standard polystyrene F-40" manufactured by Tosoh Co., Ltd.

"TSKgel standard polystyrene F-80" manufactured by Tosoh Co., Ltd.

"TSKgel standard polystyrene F-128" manufactured by Tosoh Co., Ltd.

"TSKgel standard polystyrene F-288" manufactured by Tosoh Co., Ltd.

"TSKgel standard polystyrene F-550" manufactured by Tosoh Co., Ltd.

The polyisocyanate compound (B) is described. Examples of the polyisocyanate compound (B) include aromatic diisocyanate compounds such as tolylene diisocyanate, diphenylmethane diisocyanate, m-xylylene diisocyanate, m-phenylenebis(dimethylmethylene) diisocyanate, and the like; aliphatic or alicyclic diisocyanate compounds such as hexamethylene diisocyanate, lysine diisocyanate, 1,3-bis(isocyanatomethyl)cyclohexane, 2-methyl-1,3-diisocyanatocyclohexane, 2-methyl-1,5-diisocyanatocyclohexane, 4,4'-dicyclohexylmethane diisocyanate, isophorone diisocyanate, and the like. Among these, aliphatic or alicyclic diisocyanate compounds are preferred because of excellent yellowing resistance.

Other compounds which can be used as the polyisocyanate compound (B) include prepolymers having an isocyanate group and produced by addition reaction of the above-described diisocyanate compounds with polyhydric alcohols; compounds having an isocyanurate ring and produced by cyclization trimerization of the above-described diisocyanate compounds; polyisocyanate compounds having a urea bond or bullet bond and produced by reaction of the above-described diisocyanate compounds with water; homopolymers of acrylic monomers having an isocyanate group, such as 2-isocyanatoethyl (meth)acrylate, 3-isopropenyl-α,α-dimethylbenzyl isocyanate, (meth)acryloyl isocyanate, and the like; and copolymers having an isocyanate group and produced by copolymerizing the above-described acrylic monomers having an isocyanate group with a monomer such as another acrylic monomer, a vinyl ester compound, a vinyl ether compound, an aromatic vinyl monomer, a fluoroolefin, or the like.

The polyisocyanate compounds (B) described above can be used alone or in combination of two or more.

The (meth)acrylate (C) is described. The (meth)acrylate (C) is a compound having a hydroxyl group and a (meth) acryloyl group as a polymerizable unsaturated group. Examples of the (meth)acrylate (C) include hydroxyl group-containing monofunctional (meth)acrylates such as 2-hydroxyethyl (meth)acrylate, 3-hydroxypropyl (meth)acrylate, 4-hydroxy-n-butyl (meth)acrylate, 2-hydroxypropyl (meth)acrylate, 2-hydrorxy-n-butyl (meth)acrylate, 3-hydroxy-n-buyl (meth)acrylate, 1,4-cyclohexanedimethanol mono (meth)acrylate, N-(2-hydroxyethyl) (meth)acrylamide, glycerin mono(meth)acrylate, polyethylene glycol mono (meth)acrylate, polypropylene glycol mono(meth)acrylate, 2-hydroxy-3-phenoxypropyl (meth)acrylate, 2-(meth) acryloyloxyethyl-2-hydroxyethyl phthalate, lactone-modified (meth)acrylate having a hydroxyl group at an end, and the like; and hydroxyl group-containing polyfunctional (meth) acrylates such as trimethylolpropane di(meth)acrylate, pentaerythritol tri(meth)acrylate, dipentaerythritol penta(meth) acrylate, and the like. These (meth)acrylates (C) can be used alone or in combination of two or more.

Among the (meth)acrylates (C) described above, pentaerythritol triacrylate is preferred because it can be easily handled due to low viscosity, and can increase the surface hardness of a cured coating film formed using the resultant active energy ray curable aqueous resin composition.

Examples of a method for reacting the acrylic resin (A), the polyisocyanate compound (B), and the (meth)acrylate (C) include a method of simultaneously reacting the acrylic resin (A) with the polyisocyanate compound (B) and the (meth)acrylate (C), a method of reacting the polyisocyanate compound (B) with the (meth)acrylate (C) and then reacting the acrylic resin (A), a method of reacting the acrylic resin (A) with the polyisocyanate compound (B) and then reacting the (meth)acrylate (C), and the like, and any one of these methods may be used.

The reaction of the acrylic resin (A), the polyisocyanate compound (B), and the (meth)acrylate (C) can be performed without a catalyst, but is preferably performed in the presence of a urethanization catalyst in order to accelerate proceeding of the reaction. Examples of the urethanization catalyst include amine compounds such as pyridine, pyrrole, triethylamine, diethylamine, dibutylamine, and the like; phosphine compounds such as triphenylphosphine, triethylphosphine, and the like; organic tin compounds such as dibutyltin dilaurate, octyltin trilaurate, octyltin diacetate, dibutyltin diacetate, tin octylate, and the like; organic metal compounds such as zinc octylate and the like. Among these urethanization catalysts, dibutyltin dilaurate is preferred.

The mass ratio [(A)/(C)] of the acrylic resin (A) to the (meth)acrylate (C) is preferably in a range of 0.2 to 8.0, more preferably in a range of 0.3 to 4.5, and still more preferably 0.5 to 2.5 because dispersibility in water is improved, and the storage stability of the resultant active energy ray curable aqueous resin composition is improved.

Because dispersibility in water is improved, and the storage stability of the resultant active energy ray curable aqueous resin composition is improved, the amounts of the acrylic resin (A), polyisocyanate compound (B), and (meth) acrylate (C) used are preferably such that the total number of moles of hydroxyl group of the acrylic resin (A) and hydroxyl group of the (meth)acrylate is preferably in a range of 0.2 to 1.2 and more preferably in a range of 0.4 to 1.0 per mole of isocyanate group of the polyisocyanate compound (B).

When an organic solvent is present during reaction of the acrylic resin (A), the polyisocyanate compound (B), and the (meth)acrylate (C), an organic solvent that reacts with the polyisocyanate compound (B) is preferably removed.

The active energy ray curable aqueous resin composition of the present invention contains the reaction product of reaction of the acrylic resin (A), the polyisocyanate compound (B), and the (meth)acrylate (C), but may further contain a polyfunctional (meth)acrylate (D) besides the reaction product. Examples of the polyfunctional (meth) acrylate (D) include ethylene glycol di(meth)acrylate, diethylene glycol di(meth)acrylate, triethylene glycol di(meth) acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, neopentyl glycol di(meth)acrylate, 1,3-butanediol di(meth)acrylate, 1,4-butanediol di(meth) acrylate, 1,6-hexanediol di(meth)acrylate, hydroxypivalic acid ester neopentyl glycol di(meth)acrylate, bisphenol A-di (meth)acrylate, bisphenol A-EO-modified di(meth)acrylate, isocyanuric acid EO-modified diacrylate, isocyanuric acid EO-modified triacrylate, trimethylolpropane tri(meth)acrylate, trimethylolpropane EO-modified tri(meth)acrylate, pentaerythritol tetra(meth)acrylate, ditrimethylolpropane tetraacrylate, dipentaerythritol hexa(meth)acrylate, and the like.

For the active energy ray curable aqueous resin composition of the present invention, a method for dispersing the reaction product of the acrylic resin (A), the polyisocyanate compound (B), and the (meth)acrylate (C) in an aqueous medium is not particularly limited, and, for example, a method of adding water to the reaction product, a method of adding the reaction product to water, or the like may be used.

The active energy ray curable aqueous resin composition of the present invention has excellent storage stability and forms a cured coating film having a good appearance and high adhesion to a substrate even after immersion in hot water, and thus can be desirably used for an active energy ray curable aqueous coating material.

The active energy ray curable aqueous coating material contains the active energy ray curable aqueous resin composition of the present invention, and may use, as other compounds, additives such as an antistatic agent, a defoaming agent, a viscosity adjuster, a photostabilizer, a weather stabilizer, a heat stabilizer, an ultraviolet absorber, an antioxidant, a leveling agent, a pigment dispersant, and the like.

Also, the active energy ray curable aqueous coating material of the present invention can be formed in a cured coating film by irradiation with an active energy ray after being applied on a substrate. The active energy ray refers to ultraviolet light, ionization radiation such as an electron beam, α-ray, β-ray, γ-ray, or the like. When a cured coating film is formed by irradiation with ultraviolet light as the active energy ray, a photopolymerization initiator (E) is preferably added to the active energy ray curable aqueous coating material of the present invention in order to improve curability. Also, if required, a photosensitizer can be further added to improve curability. On the other hand, ionization radiation such as an electron beam, α-ray, β-ray, or γ-ray is used, the photopolymerization initiator (E) and the photosensitizer need not be particularly added because curing rapidly proceeds even when the photopolymerization initiator (E) and the photosensitizer are absent.

An intramolecular cleavage-type photopolymerization initiator and a hydrogen abstraction-type photopolymerization initiator can be used as the photopolymerization initiator (E). Examples of the intramolecular cleavage-type photopolymerization initiator include acetophenone compounds such as diethoxyacetophenone, 2-hydroxy-2-methyl-1-phenylpropan-1-one, benzyldimethyl ketal, 1-(4-isopropylphenyl)-2-hydroxy-2-methylpropan-1-one, 4-(2-hydroxyethoxy)phenyl-(2-hydrorxy-2-propyl) ketone, 1-hydroxycyclohexyl-phenyl ketone, 2-methyl-2-morpholino(4-thiomethylphenyl)propan-1-one, 2-benzyl-2-dimethylamino-1-(4-morpholinophenyl)-butanone, and the like; benzoins such as benzoin, benzoin methyl ether, benzoin isopropyl ether, and the like; acylphospine oxide compounds such as 2,4,6-trimethylbenzoin diphenylphosphine oxide, bis(2,4,6-trimethylbenzoyl)-phenylphosphine oxide, and the like; benzyl; methylphenyl glyoxyester; and the like.

On the other hand, examples of the hydrogen abstraction-type photopolymerization initiator include benzophenone compounds such as benzophenone, methyl o-benzoylbenzoate, 4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(tert-butylperoxycarbonyl)benzophenone, 3,3'-dimethyl-4-methoxybenzophenone, and the like; thioxanthone compounds such as 2-isopropylthioxanthone, 2,4-diemthylthioxanthone, 2,4-diethylthioxanthone, 2,4-dichlorothioxanthone, and the like; aminobenzophenone compounds such as Michlers's ketone, 4,4'-diethylaminobenzophenone, and the like; 10-butyl-2-chloroacridone; 2-ethylanthraquinone; 9,10-phenanthrenequinone; camphorquinone; and the like. These photopolymerization initiators (E) can be used alone or in combination of two or more.

In addition, examples of the photosensitizer include amines such as aliphatic amines, aromatic amines, and the like; ureas such as o-tolylthiourea and the like; sulfur compounds such as sodium diethyldithiophosphate, s-benzylisothiuronium-p-toluenesulfonate, and the like.

The amount of each of the photopolymerization initiator used and the photosensitizer used is preferably 0.05 to 20 parts by mass and more preferably 0.5 to 10% by mass relative to 100 parts by mass of the nonvolatile component in the active energy ray curable aqueous coating material of the present invention.

Also, the active energy ray curable aqueous coating material can be used as a coating material for coating various articles. Articles which can be coated with the active energy ray curable aqueous coating material of the present invention include casings of home electric appliances such as a television, a refrigerator, a washing machine, an air conditioner, and the like; casings of electronic apparatuses such as a personal computer, a smartphone, a cellular phone, a digital camera, a game machine, and the like; interior materials of various vehicles such as an automotive car, a railcar, and the like; various building materials such as a decorative sheet, and the like; wood materials of a furniture and the like, and artificial/synthetic leathers; a FRP bath; etc.

In addition, a method of coating the active energy ray curable aqueous coating material of the present invention depends on applications, and examples of the method include a gravure coater, a roll coater, a comma coater, a knife coater, an air knife coater, a curtain coater, a kiss coater, a shower coater, a Wheeler coater, a spin coater, dipping, screen printing, spraying, an applicator, a bar coater, and the like.

As described above, the active energy ray used for curing the active energy ray curable aqueous coating material of the present invention is ultraviolet light, ionization radiation such as an electron beam, α-ray, β-ray, γ-ray, or the like. Specific examples of an energy source or a curing apparatus include a bactericidal lamp, a fluorescent lamp for ultraviolet light, a carbon arc, a xenon lamp, a high-pressure mercury lamp for copying, a medium-pressure or high-pressure mercury lamp, an extra-high-pressure mercury lamp, an electrodeless lamp, a metal halide lamp, ultraviolet light from a light source such as natural light or the like, an electron beam from a scanning or curtain-type electron beam accelerator, and the like.

EXAMPLES

The present invention is described in further detail below with reference to examples. A hydroxyl value and acid value of a polymer were measured according to JIS test method K 0070-1992. Also, a weight-average molecular weight (Mw) of a polymer was measured under GPC measurement conditions below.

[GPC Measurement Conditions]

Measuring apparatus: high-speed GPC apparatus ("HLC-8220GPC" manufactured by Tosoh Co., Ltd.)

Column: columns below manufactured by Tosoh Co., Ltd. were connected in series and used.

"TSKgel G5000" (7.8 mm I. D.×30 cm)×1 column
"TSKgel G4000" (7.8 mm I. D.×30 cm)×1 column
"TSKgel G3000" (7.8 mm I. D.×30 cm)×1 column
"TSKgel G2000" (7.8 mm I. D.×30 cm)×1 column
Detector: RI (differential refractometer)
Column temperature: 40° C.
Eluent: tetrahydrofuran (THF)
Flow rate: 1.0 ml/min
Injection amount: 100 μL (tetrahydrofuran solution with a sample concentration of 4 mg/mL)

Standard sample: a calibration curve was formed by using monodisperse polystyrene described below.

(Monodisperse Polystyrene)

"TSKgel standard polystyrene A-500" manufactured by Tosoh Co., Ltd.
"TSKgel standard polystyrene A-1000" manufactured by Tosoh Co., Ltd.
"TSKgel standard polystyrene A-2500" manufactured by Tosoh Co., Ltd.
"TSKgel standard polystyrene A-5000" manufactured by Tosoh Co., Ltd.
"TSKgel standard polystyrene F-1" manufactured by Tosoh Co., Ltd.
"TSKgel standard polystyrene F-2" manufactured by Tosoh Co., Ltd.
"TSKgel standard polystyrene F-4" manufactured by Tosoh Co., Ltd.
"TSKgel standard polystyrene F-10" manufactured by Tosoh Co., Ltd.
"TSKgel standard polystyrene F-20" manufactured by Tosoh Co., Ltd.
"TSKgel standard polystyrene F-40" manufactured by Tosoh Co., Ltd.
"TSKgel standard polystyrene F-80" manufactured by Tosoh Co., Ltd.
"TSKgel standard polystyrene F-128" manufactured by Tosoh Co., Ltd.
"TSKgel standard polystyrene F-288" manufactured by Tosoh Co., Ltd.
"TSKgel standard polystyrene F-550" manufactured by Tosoh Co., Ltd.

Synthesis Example 1

Synthesis of Polymer (A-1)

In a four-neck flask provided with a stirrer, a thermometer, a cooling tube, and a nitrogen inlet tube, 340 g of diethylene glycol dimethyl ether was placed and heated to 110° C. under a nitrogen stream, and then a mixture containing 325 g of methoxypolyethylene glycol acrylate (number of oxyethylene units per molecule: 13 on average; hereinafter abbreviated as "13EOA"), 45 g of 2-hydroxyethyl methacrylate (hereinafter abbreviated as "HEMA"), 280 g of n-butyl acrylate (hereinafter abbreviated as "BA"), and 10 g of tert-butylperoxy-2-ethyl hexanoate was added dropwise over 5 hours. After addition, reaction was performed at 110° C. for 9 hours to yield a solution (resin content of 65% by mass) of a polymer having a weight-average molecular weight of 12,000 and a hydroxyl value of 30. The polymer is abbreviated as "polymer (A-1)".

Synthesis Example 2

Synthesis of Polymer (A-2)

In a four-neck flask provided with a stirrer, a thermometer, a cooling tube, and a nitrogen inlet tube, 340 g of diethylene glycol dimethyl ether was placed and heated to 110° C. under a nitrogen stream, and then a mixture containing 325 g of 13EOA, 91 g of HEMA, 234 g of isobornyl acrylate (hereinafter abbreviated as "IBA"), and 10 g of tert-butylperoxy-2-ethyl hexanoate was added dropwise over 5 hours. After addition, reaction was performed at 110° C. for 9 hours to yield a solution (resin content of 65% by mass) of a polymer having a weight-average molecular weight of 15,000 and a hydroxyl value of 60. The polymer is abbreviated as "polymer (A-2)".

Synthesis Example 3

Synthesis of Polymer (A-3)

In a four-neck flask provided with a stirrer, a thermometer, a cooling tube, and a nitrogen inlet tube, 340 g of diethylene glycol dimethyl ether was placed and heated to 110° C. under a nitrogen stream, and then a mixture containing 423 g of methoxypolyethylene glycol methacrylate (number of oxyethylene units per molecule: 9 on average; hereinafter abbreviated as "9EOMA"), 45 g of HEMA, 201 g of n-butyl methacrylate (hereinafter abbreviated as "BMA"), and 10 g of tert-butylperoxy-2-ethyl hexanoate was added dropwise over 5 hours. After addition, reaction was performed at 110° C. for 9 hours to yield a solution (resin content of 65% by mass) of a polymer having a weight-average molecular weight of 14,000 and a hydroxyl value of 17. The polymer is abbreviated as "polymer (A-3)".

Synthesis Example 4

Synthesis of Polymer (A-4)

In a four-neck flask provided with a stirrer, a thermometer, a cooling tube, and a nitrogen inlet tube, 340 g of dipropylene glycol dimethyl ether was placed and heated to 110° C. under a nitrogen stream, and then a mixture containing 130 g of 13EOA, 130 g of methoxypolyethylene glycol acrylate (number of oxyethylene units per molecule: 23 on average; hereinafter abbreviated as "23EOA"), 45 g of 2-hydroxyethyl acrylate (hereinafter abbreviated as "HEA"), 280 g of cyclohexyl methacrylate (hereinafter abbreviated as "CHMA"), and 10 g of tert-butylperoxy-2-ethyl hexanoate was added dropwise over 5 hours. After addition, reaction was performed at 110° C. for 9 hours to yield a solution (resin content of 65% by mass) of a polymer having a weight-average molecular weight of 16,000 and a hydroxyl value of 30. The polymer is abbreviated as "polymer (A-4)".

Synthesis Example 5

Synthesis of Polymer (RA-1)

In a four-neck flask provided with a stirrer, a thermometer, a cooling tube, and a nitrogen inlet tube, 340 g of diethylene glycol dimethyl ether was placed and heated to 110° C. under a nitrogen stream, and then a mixture containing 325 g of 13EOA, 325 g of BA, and 10 g of tert-butylperoxy-2-ethyl hexanoate was added dropwise over 5 hours. After addition, reaction was performed at 110° C. for 9 hours to yield a solution (resin content of 65% by mass) of a polymer was confirmed to disappear, thereby yielding a urethane acrylate composition (RB-1) as a mixture of urethane acrylate and pentaerythritol tetraacrylate.

Table 1 shows the monomer compositions of the polymers (A-1) to (A-4), (RA-1), and (RA-2) synthesized in Synthesis Examples 1 to 6.

TABLE 1

| | | | Synthesis Example 1 | Synthesis Example 2 | Synthesis Example 3 | Synthesis Example 4 | Synthesis Example 5 | Synthesis Example 6 |
|---|---|---|---|---|---|---|---|---|
| Polymer (A) | | | A-1 | A-2 | A-3 | A-4 | RA-1 | RA-2 |
| Monomer composition (g) | Monomer (a1) having polyoxyalkylene group | 9EOMA | | | 423 | | | |
| | | 13EOA | 325 | 325 | | 130 | 325 | |
| | | 23EOA | | | | 130 | | |
| | Monomer (a2) having hydroxyl group | HEMA | 45 | 91 | 45 | | | |
| | | HEA | | | | 45 | | |
| | Other monomer (a3) | BA | 280 | | | | 325 | 130 |
| | | BMA | | | 201 | | | |
| | | IBA | | 234 | | | | |
| | | CHMA | | | | 280 | | |
| | | cIA | | | | | | 13 |
| | | MMA | | | | | | 390 |
| | | AA | | | | | | 78 | having a weight-average molecular weight of 10,000. The polymer is abbreviated as "polymer (RA-1)".

Synthesis Example 6

Synthesis of Polymer (RA-2)

In a four-neck flask provided with a stirrer, a thermometer, a cooling tube, and a nitrogen inlet tube, 340 g of diethylene glycol dimethyl ether and 13 g of w-carboxy-polycaprolactone monoacrylate ("Aronix M5300" manufactured by Toa Gosei Co., Ltd., hereinafter abbreviated as "cIA") were placed and heated to 110° C. under a nitrogen stream, and then a mixture containing 39 g of HEMA, 390 g of methyl methacrylate (hereinafter abbreviated as "MMA"), 130 g of BA, 78 g of acrylic acid (hereafter abbreviated as "AA"), and 9 g of tert-butylperoxy-2-ethyl hexanoate was added dropwise over 5 hours. After addition, reaction was performed at 110° C. for 9 hours to yield a solution (resin content of 65% by mass) of a polymer having a weight-average molecular weight of 35,000 and an acid value of 97. The polymer is abbreviated as "polymer (RA-2)".

Synthesis Example 7

Synthesis of Urethane Acrylate Composition (RB-1)

In a four-neck flask provided with a stirrer, a thermometer, and a cooling tube, 104 g of hexamethylene diisocyanate, 0.2 g of methoquinone, and 0.2 g of dibutyltin dilaurate were placed and heated to 60° C. under stirring. At the same temperature, 645 g of a mixture ("Aronix M305" manufactured by Toa Gosei Co., Ltd., ratio of pentaerythritol triacrylate: 60% by mass, hydroxyl value: 115, hereinafter abbreviated as a "PETA mixture") containing pentaerythritol triacrylate (hereinafter abbreviated as "PETA") and pentaerythritol tetraacrylate was added in divided amounts 10 times at an interval of 10 minutes. Further, reaction was continued for 5 hours and then terminated after absorption of an isocyanate group at 2250 $cm^{-1}$ in an infrared spectrum Example 1

Preparation of Active Energy Ray Curable Aqueous Resin Composition (W-1)

In a four-neck flask provided with a stirrer, a thermometer, and a cooling tube, 615 g of a 65 mass % solution (400 g of the polymer (A-1)) of the polymer (A-1) yielded in Synthesis Example 1, 0.2 g of methoquinone, 0.2 g of dibutyltin dilaurate, 472 g of the PETA mixture, and 128 g of 4,4'-dicyclohexylmethane diisocyanate (hereinafter abbreviated as "$H_{12}MDI$") were placed and heated to 80° C., followed by further mixing under stirring for 5 hours at the same temperature. After absorption of an isocyanate group at 2250 $cm^{-1}$ in an infrared spectrum was confirmed to disappear, the reaction was terminated. Next, the resultant reaction product was mixed with 1,285 g of ion exchange water and further mixed with 40 g of a photopolymerization initiator ("Irgacure 500" manufactured by BASF Japan Ltd., eutectic mixture of 1-hydroxycyclohexyl phenyl ketone and benzophenone at a molar ratio of 1:1), yielding an active energy ray curable aqueous resin composition (W-1).

Example 2

Preparation of Active Energy Ray Curable Aqueous Resin Composition (W-2)

In a four-neck flask provided with a stirrer, a thermometer, and a cooling tube, 563 g of the PETA mixture, 187 g of $H_{12}MDI$, 0.2 g of methoquinone, and 0.2 g of dibutyltin dilaurate were placed and heated to 80° C., followed by further mixing under stirring for 2 hours at the same temperature. Then, 385 g of a 65 mass % solution (250 g of the polymer (A-2)) of the polymer (A-2) yielded in Synthesis Example 2 was added to the resultant mixture. The mixture was further mixed under stirring for 4 hours at the same temperature, and after absorption of an isocyanate group at 2250 $cm^{-1}$ in an infrared spectrum was confirmed to disappear, the reaction was terminated. Next, the resultant reaction product was mixed with 1,365 g of ion exchange water and further mixed with 40 g of a photopolymerization initiator ("Irgacure 500" manufactured by BASF Japan Ltd., eutectic mixture of 1-hydroxycyclohexyl phenyl ketone and benzophenone at a molar ratio of 1:1), yielding an active energy ray curable aqueous resin composition (W-2).

Example 3

Preparation of Active Energy Ray Curable Aqueous Resin Composition (W-3)

In a four-neck flask provided with a stirrer, a thermometer, and a cooling tube, 563 g of the PETA mixture, 183 g of isophorone diisocyanate (hereinafter abbreviated as "IPDI"), 0.2 g of methoquinone, and 0.2 g of dibutyltin dilaurate were placed and heated to 80° C., followed by further mixing under stirring for 2 hours at the same temperature. Then, 567 g of a 65 mass % solution (369 g of the polymer (A-2)) of the polymer (A-2) yielded in Synthesis Example 2 was added to the resultant mixture. The mixture was further mixed under stirring for 4 hours at the same temperature, and after absorption of an isocyanate group at 2250 $cm^{-1}$ in an infrared spectrum was confirmed to disappear, the reaction was terminated. Next, the resultant reaction product was mixed with 1,365 g of ion exchange water and further mixed with 40 g of a photopolymerization initiator ("Irgacure 500" manufactured by BASF Japan Ltd., eutectic mixture of 1-hydroxycyclohexyl phenyl ketone and benzophenone at a molar ratio of 1:1), yielding an active energy ray curable aqueous resin composition (W-2).

Example 4

Preparation of Active Energy Ray Curable Aqueous Resin Composition (W-4)

In a four-neck flask provided with a stirrer, a thermometer, and a cooling tube, 385 g of a 65 mass % solution (250 g of the polymer (A-3)) of the polymer (A-3) yielded in Synthesis Example 3, 0.2 g of methoquinone, 0.2 g of dibutyltin dilaurate, 610 g of the PETA mixture, and 140 g of IPDI were placed and heated to 80° C., followed by further mixing under stirring for 5 hours at the same temperature. After absorption of an isocyanate group at 2250 $cm^{-1}$ in an infrared spectrum was confirmed to disappear, the reaction was terminated. Next, the resultant reaction product was mixed with 1,365 g of ion exchange water and further mixed with 40 g of a photopolymerization initiator ("Irgacure 500" manufactured by BASF Japan Ltd., eutectic mixture of 1-hydroxycyclohexyl phenyl ketone and benzophenone at a molar ratio of 1:1), yielding an active energy ray curable aqueous resin composition (W-4).

Example 5

Preparation of Active Energy Ray Curable Aqueous Resin Composition (W-5)

In a four-neck flask provided with a stirrer, a thermometer, and a cooling tube, 769 g of a 65 mass % solution (500 g of the polymer (A-4)) of the polymer (A-4) yielded in Synthesis Example 3, 0.2 g of methoquinone, 0.2 g of dibutyltin dilaurate, 426 g of the PETA mixture, and 74 g of hexamethylene diisocyanate (hereinafter abbreviated as "HDI") were placed and heated to 80° C., followed by further mixing under stirring for 5 hours at the same temperature. After absorption of an isocyanate group at 2250 $cm^{-1}$ in an infrared spectrum was confirmed to disappear, the reaction was terminated. Next, the resultant reaction product was mixed with 1,305 g of ion exchange water and further mixed with 40 g of a photopolymerization initiator ("Irgacure 500" manufactured by BASF Japan Ltd., eutectic mixture of 1-hydroxycyclohexyl phenyl ketone and benzophenone at a molar ratio of 1:1), yielding an active energy ray curable aqueous resin composition (W-5).

Comparative Example 1

Preparation of Active Energy Ray Curable Aqueous Resin Composition (RW-1)

In a four-neck flask provided with a stirrer, a thermometer, and a cooling tube, 615 g of a 65 mass % solution (400 g of the polymer (RA-1)) of the polymer (RA-1) yielded in Synthesis Example 5, 0.2 g of methoquinone, 0.2 g of dibutyltin dilaurate, 493 g of the PETA mixture, and 107 g of $H_{12}MDI$ were placed and heated to 80° C., followed by further mixing under stirring for 5 hours at the same temperature. After absorption of an isocyanate group at 2250 $cm^{-1}$ in an infrared spectrum was confirmed to disappear, the reaction was terminated. Next, the resultant reaction product was mixed with 1,285 g of ion exchange water and further mixed with 40 g of a photopolymerization initiator ("Irgacure 500" manufactured by BASF Japan Ltd., eutectic mixture of 1-hydroxycyclohexyl phenyl ketone and benzophenone at a molar ratio of 1:1), yielding an active energy ray curable aqueous resin composition (RW-1).

Comparative Example 2

Preparation of Active Energy Ray Curable Aqueous Resin Composition (RW-2)

In a four-neck flask provided with a stirrer, a thermometer, and a cooling tube, 442 g of a 65 mass % solution (287 g of the polymer (RA-2)) of the polymer (RA-2) yielded in Synthesis Example 6, 500 g of the urethane acrylate composition (RB-1) yielded in Synthesis Example 7, and 200 g of the PETA mixture were placed, and 40 g of triethylamine was added to the resultant mixture under heating at 70° C. and stirring, followed by mixing under stirring. Next, 1,379 g of ion exchange water was added in divided amounts 10 times, and the resultant mixture was further mixed with 40 g of a photopolymerization initiator ("Irgacure 500" manufactured by BASF Japan Ltd., eutectic mixture of 1-hydroxycyclohexyl phenyl ketone and benzophenone at a molar ratio of 1:1), yielding an active energy ray curable aqueous resin composition (RW-2).

Table 2 shows the compositions of the active energy ray curable aqueous resin compositions prepared as described above.

TABLE 2

|  |  |  | Example 1 | Example 2 | Example 3 | Example 4 | Example 5 | Comparative Example 1 | Comparative Example 2 |
|---|---|---|---|---|---|---|---|---|---|
| Active energy ray curable aqueous resin composition |  |  | W-1 | W-2 | W-3 | W-4 | W-5 | RW-1 | RW-2 |
| Composition (g) | Polymer (A) | Polymer (A-1) | 400 |  |  |  |  |  |  |
|  |  | Polymer (A-2) |  | 250 | 369 |  |  |  |  |
|  |  | Polymer (A-3) |  |  |  | 250 |  |  |  |
|  |  | Polymer (A-4) |  |  |  |  | 500 |  |  |
|  |  | Polymer (RA-1) |  |  |  |  |  | 400 |  |
|  |  | Polymer (RA-2) |  |  |  |  |  |  | 287 |
|  | Polyisocyanate compound (B) | $H_{12}$MDI | 128 | 187 |  |  |  | 107 |  |
|  |  | IPDI |  |  | 183 | 140 |  |  |  |
|  |  | HDI |  |  |  |  | 74 |  |  |
|  | Polyfunctional (meth)acrylate (C) | PETA mixture (PETA 60% by mass) | 472 | 563 | 563 | 610 | 426 | 493 | 200 |
|  | Urethane acrylate composition (RB-1) |  |  |  |  |  |  |  | 500 |
|  | Other component | Ion exchange water | 1,285 | 1,365 | 1,365 | 1,365 | 1,305 | 1,285 | 1,379 |
|  |  | Triethylamine |  |  |  |  |  |  | 40 |

Example 6

Evaluation of Active Energy Ray Curable Aqueous Resin Composition (W-1)

The active energy ray curable aqueous resin composition (W-1) yielded in Example 1 was evaluated with respect to storage stability, and the appearance and surface hardness (pencil hardness) of a cured coating film in order to evaluate performance as an active energy ray curable aqueous coating material.

[Evaluation of Storage Stability]

The active energy ray curable aqueous resin composition (W-1) was sealed in a 200 ml glass vessel and stored in a standing state at 40° C., and separation of the components was visually observed to evaluate storage stability according to the following criteria.

A: Neither separation nor sedimentation occurred for 6 months or more.

B: Separation or sedimentation occurred after 2 months or more and less than 6 months.

C: Separation or sedimentation occurred after less than 2 month.

[Formation of Cured Coating Film for Evaluation]

Each of a glass plate and an ABS (acrylonitrile-butadiene-styrene copolymer) plate was coated with the active energy ray curable aqueous resin composition (W-1) by spray coating so that the thickness after drying was 10 μm, pre-dried for 10 minutes at a temperature of 60° C. in a dryer, and then irradiated with ultraviolet light with an irradiation amount of 0.8 J/cm² by using a high-pressure mercury lamp with an output of 80 W/cm, forming a cured coating film for evaluation.

[Evaluation of Appearance of Cured Coating Film]

The appearance of the cured coating film for evaluation formed as described above was visually observed to evaluate the appearance of the cured coating film according to the following criteria.

A: The cured coating film was transparent.

B: The cured coating film was slightly whitened.

C: The cured coating film was whitened.

[Evaluation of Adhesion of Coating Film]

The cured coating film formed on the ABS plate was cut to (10×10) 1-mm squares with a cutter, and a peel test was conducted using a cellophane tape to evaluate adhesion of the coating film by measuring a number of remaining squares according to criteria below. In addition, the cured coating film was immersed together with the ABS plate in hot water at 80° C. for 2 hours, taken out, and then dried at 25° C. for 2 hours. Then, the same peel test with a cellophane tape was conducted to evaluate adhesion of the cured coating film after immersion in hot water by measuring a number of remaining squares according to the criteria below.

A: 95 to 100

B: 60 to 94

C: 59 or less

[Measurement and Evaluation of Pencil Hardness]

The surface of the cured coating film for evaluation formed as described above was measured according to JIS K5600-5-4:1999 using a pencil specified in JIS S 6006:2007, and the hardness of a hardest pencil that caused no scratch was determined as pencil hardness.

Examples 7 to 10

Evaluation of Active Energy Ray Curable Aqueous Resin Compositions (W-2) to (W-5)

The storage stability and appearance and surface hardness (pencil hardness) of a cured coating film were evaluated as performance as an active energy ray curable aqueous coating material by the same operations as in Example 6 except that each of the active energy ray curable aqueous resin compositions (W-2) to (W-5) yielded in Examples 2 to 5 was used in place of the active energy ray curable aqueous resin composition (W-1) used in Example 6.

Comparative examples 3 and 4

Evaluation of Active Energy Ray Curable Aqueous Resin Compositions (RW-1) and (RW-2)

The storage stability and appearance and surface hardness (pencil hardness) of a cured coating film were evaluated as performance as an active energy ray curable aqueous coating material by the same operations as in Example 6 except that each of the active energy ray curable aqueous resin compositions (RW-1) and (RW-2) yielded in Comparative Examples 1 and 2 was used in place of the active energy ray curable aqueous resin composition (W-1) used in Example 6.

Table 3 shows the evaluation results of Examples 6 to 10 and Comparative Examples 3 and 4.

TABLE 3

| | Example 6 | Example 7 | Example 8 | Example 9 | Example 10 | Comparative Example 3 | Comparative Example 4 |
|---|---|---|---|---|---|---|---|
| Active energy ray curable aqueous resin composition | W-1 | W-2 | W-3 | W-4 | W-5 | RW-1 | RW-2 |
| Storage stability | A | A | A | A | A | C | B |
| Coating film appearance | A | A | A | A | A | C | B |
| Adhesion of coating film — Before immersion in hot water | A | A | A | A | A | A | A |
| Adhesion of coating film — After immersion in hot water | A | A | A | A | A | C | B |
| Pencil hardness | H | 4H | 4H | 2H | 3H | H | 2H |

According to the evaluation results shown in Table 3, the active energy ray curable aqueous resin composition of the present invention has excellent storage stability, and the cured coating film is excellent in appearance. Also, it was found that the coating film has high adhesion after the hot-water test.

On the other hand, Comparative Example 3 is an example using the polymer produced without using the acrylic monomer (a2) having a hydroxyl group used as an essential raw material of the present invention. Comparative Example 3 shows poor storage stability and coating film appearance, and also exhibits unsatisfactory adhesion of the cured coating film after immersion in hot water.

Comparative Example 4 is an example using the polymer having a carboxyl group neutralized with an amine produced without using the acrylic monomer (a1) having a polyoxyalkylene group used as an essential raw material of the present invention. Comparative Example 4 shows somewhat poor storage stability and coating film appearance, and also exhibits somewhat unsatisfactory adhesion of the cured coating film after immersion in hot water.

The invention claimed is:

1. An active energy ray curable aqueous resin composition prepared by:
   reacting an acrylic resin (A), a polyisocyanate compound (B), and a (meth)acrylate (C) having a hydroxyl group to form an active energy ray curable resin; and
   dispersing the active energy ray curable resin in an aqueous medium, wherein the acrylic resin (A) is produced by copoly
   merizing an acrylic monomer (a1) having a polyoxyalkylene group, an acrylic monomer (a2) having a hydroxyl group, and an acrylic monomer (a3) other than the acrylic monomer (a1)) and the acrylic monomer (a2) as essential raw materials,
   a ratio by mass of the acrylic monomer (a1) in the monomer components as the raw materials of the acrylic resin (A) is in a range of 30 to 90% by mass,
   a ratio by mass of the acrylic monomer (a2) in the monomer components is in a range of 2 to 30% by mass, and
   a mass ratio ((A)/(C)) of the acrylic resin (A) and the (meth)acrylate (C) is in a range of 0.2 to 8.0, and
   wherein the active energy ray curable resin is curable by irradiation.

2. The active energy ray curable aqueous resin composition according to claim 1, wherein the polyoxyalkylene group is a polyoxyethylene group.

3. The active energy ray curable aqueous resin composition according to claim 1, wherein the polyisocyanate compound (B) is an aliphatic diisocyanate compound or an alicyclic diisocyanate compound.

4. The active energy ray curable aqueous resin composition according to claim 1, wherein the (meth)acrylate (C) is pentaerythritol triacrylate.

5. The active energy ray curable aqueous resin composition according to Claim1, wherein the acrylic monomer (a3) is an alicyclic acrylic monomer.

6. An active energy ray curable aqueous coating material comprising the active energy ray curable aqueous resin composition according claim 1.

7. An article coated with the active energy ray curable aqueous coating material according to claim 6.

8. The active energy ray curable aqueous resin composition according to claim 2, wherein the polyisocyanate compound (B) is an aliphatic diisocyanate compound or an alicyclic diisocyanate compound.

* * * * *